(12) United States Patent
Groninga et al.

(10) Patent No.: US 11,807,357 B2
(45) Date of Patent: Nov. 7, 2023

(54) TILTING HEXROTOR AIRCRAFT

(71) Applicant: Bell Textron Inc., Fort Worth, TX (US)

(72) Inventors: Kirk L. Groninga, Keller, TX (US);
Danielle Lynn Moore, Arlington, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 345 days.

(21) Appl. No.: 17/527,900

(22) Filed: Nov. 16, 2021

(65) Prior Publication Data
US 2022/0306293 A1    Sep. 29, 2022

Related U.S. Application Data

(63) Continuation-in-part of application No. 17/216,591, filed on Mar. 29, 2021.

(51) Int. Cl.
*B64C 29/00* (2006.01)
*B64D 27/26* (2006.01)
*B64C 39/12* (2006.01)

(52) U.S. Cl.
CPC .......... *B64C 29/0033* (2013.01); *B64C 39/12* (2013.01); *B64D 27/26* (2013.01)

(58) Field of Classification Search
CPC ..... B64C 29/0033; B64C 39/12; B64C 39/08; B64C 39/04; B64C 3/385; B64C 27/30; B64D 27/26; B64D 27/02
See application file for complete search history.

(56) References Cited

U.S. PATENT DOCUMENTS

| | | | |
|---|---|---|---|
| 8,708,273 B2 * | 4/2014 | Oliver | B64D 27/12 244/66 |
| 9,120,561 B2 | 9/2015 | Armer et al. | |
| 9,751,625 B2 | 9/2017 | Phan et al. | |
| 10,183,744 B2 | 1/2019 | Gamble | |
| 10,501,173 B1 | 12/2019 | Douglas et al. | |

(Continued)

FOREIGN PATENT DOCUMENTS

| | | | |
|---|---|---|---|
| EP | 4105124 A1 * | 12/2022 | |
| WO | WO-2020060839 A1 * | 3/2020 | B64C 11/46 |

OTHER PUBLICATIONS

The Vertical Flight Society, The Electric VTOL News™ "Powering the Future of Aviation," 2021 © Joby Aviation, Santa Cruz, CA, USA, 17 pages; https://evtol.news/joby-s4.

*Primary Examiner* — Brady W Frazier
(74) *Attorney, Agent, or Firm* — Akona IP

(57) ABSTRACT

One embodiment is an aircraft operable in a hover mode and a cruise mode and including a fuselage; wings connected on opposite sides of the fuselage; a canard connected to the fuselage forward of the wings; forward propulsion systems connected to a trailing edge of the canard on opposite sides of the fuselage; aft propulsion systems connected to trailing edges of the wings; and wing-mounted propulsion systems connected to leading edges of the wings. The aft propulsion systems are tiltable between a first position when the aircraft is in the hover mode and a second position when the aircraft is in the cruise mode. Each of the propulsion systems includes a rotor assembly comprising a plurality of rotor blades. The propulsion systems are substantially equidistant from a center of gravity (CG) of the aircraft.

20 Claims, 6 Drawing Sheets

(56) References Cited

U.S. PATENT DOCUMENTS

| | | |
|---|---|---|
| 10,994,829 B2 | 5/2021 | Duffy et al. |
| 11,136,115 B2 * | 10/2021 | Fenny .................. G05D 1/0202 |
| 11,174,019 B2 | 11/2021 | Moore et al. |
| 11,279,478 B2 * | 3/2022 | Fenny ..................... B64C 39/06 |
| 2013/0092799 A1 * | 4/2013 | Tian ........................ B64C 39/10 |
| | | 244/7 R |
| 2017/0240274 A1 * | 8/2017 | Regev ..................... B64C 27/28 |
| 2020/0148347 A1 | 5/2020 | Bevirt et al. |
| 2020/0354046 A1 * | 11/2020 | Knoll ..................... B64C 27/32 |
| 2020/0354048 A1 * | 11/2020 | Melo ..................... B64C 39/08 |
| 2020/0398983 A1 | 12/2020 | Singh et al. |
| 2021/0107640 A1 | 4/2021 | Baity et al. |
| 2021/0206483 A1 | 7/2021 | Lee et al. |
| 2021/0253234 A1 | 8/2021 | Tao et al. |
| 2022/0009626 A1 | 1/2022 | Baharav et al. |

* cited by examiner

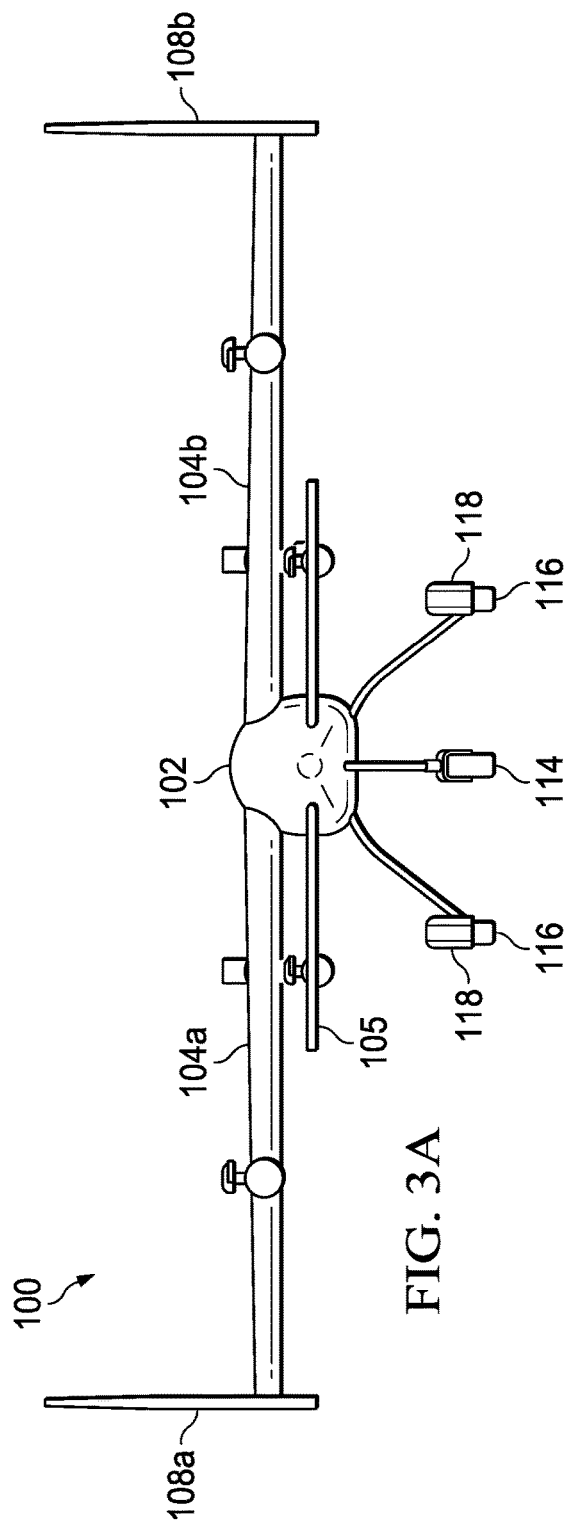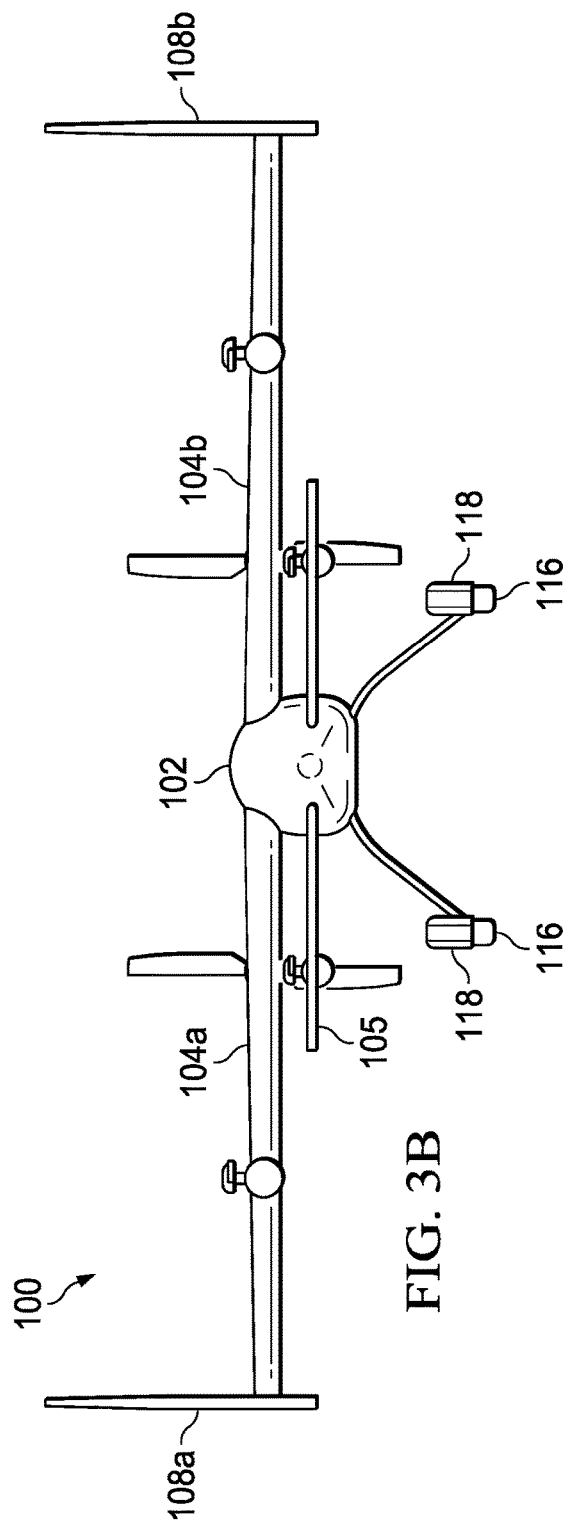

TILTING HEXROTOR AIRCRAFT

CROSS-REFERENCE TO RELATED APPLICATION

This application claims the benefit of and priority to U.S. patent application Ser. No. 17/216,591, filed Mar. 29, 2021, entitled "TILTING HEXROTOR AIRCRAFT," which is incorporated herein by reference in its entirety.

TECHNICAL FIELD

This disclosure relates in general to the field of tiltrotor aircraft and, more particularly, though not exclusively, to tilting hexrotor arrangements for such aircraft.

BACKGROUND

An electric vertical take-off and landing (eVTOL) is a type of aircraft that uses electric power to supply rotational energy through electric motor(s) to props, rotors, or fans in an aircraft propulsion system for enabling the aircraft to hover, take-off, and land vertically. Because of their versatility and lack of a need for a runway, eVTOLs are particularly useful for providing urban air mobility. As used herein, the term eVTOL also includes VTOLs that use hybrid-electric (with an engine running a generator producing electricity and battery stored power), turbo electric (an engine running a generator providing all power required), or all-battery powered propulsion systems. One particular type of eVTOL is an electric tiltrotor aircraft.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements:

FIG. 3A illustrates a front plan view of the tilting hexrotor aircraft of FIGS. 1A and 1B with the rotors configured in a hover mode of operation in accordance with embodiments described herein;

FIG. 3B illustrates a front plan view of the tilting hexrotor aircraft of FIGS. 1A and 1B with the rotors configured in a cruise mode of operation in accordance with embodiments described herein.

DETAILED DESCRIPTION

Figure 1A:
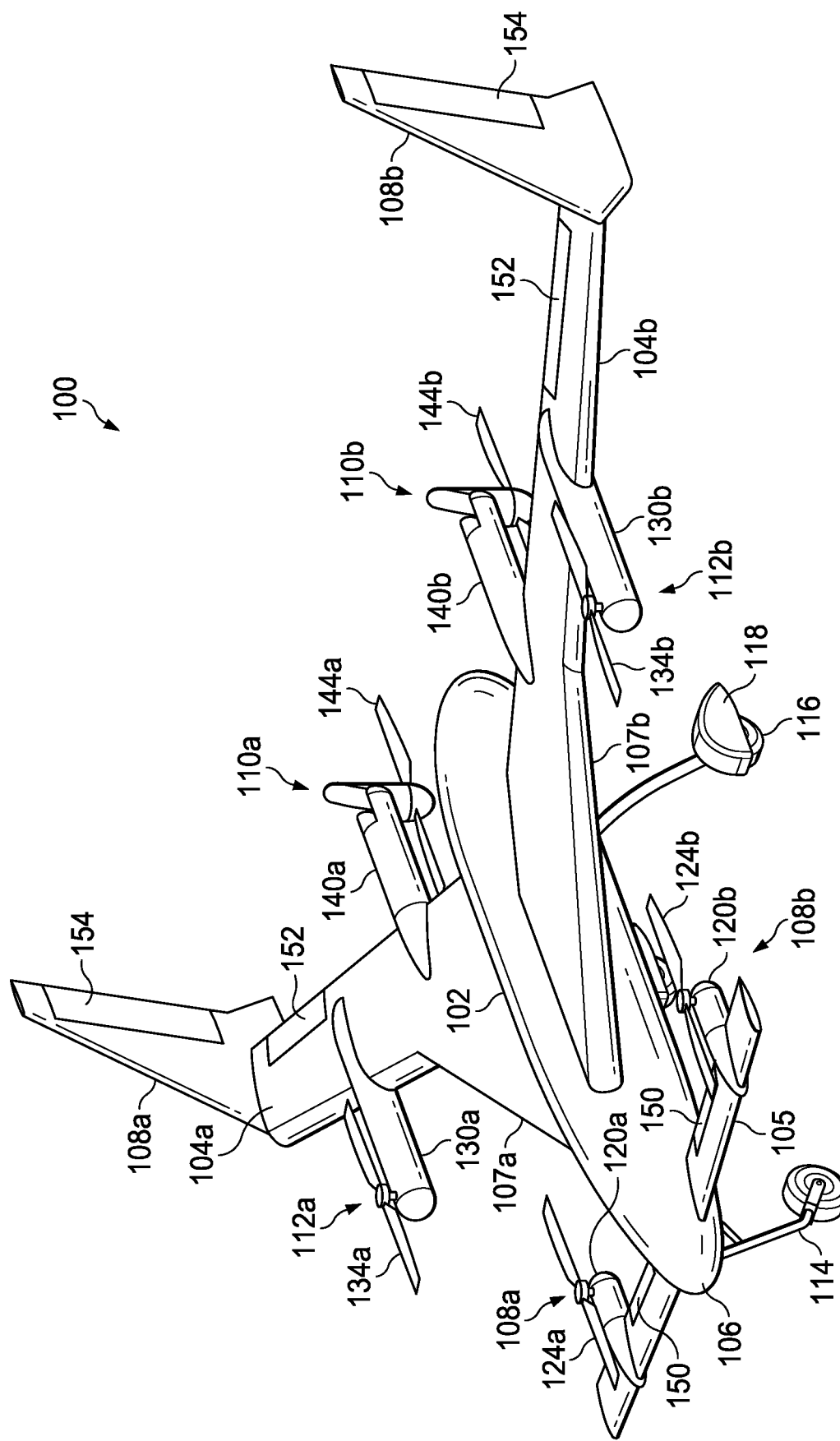
FIG. 1A illustrates a perspective view of a tilting hexrotor aircraft with the rotors configured in a hover mode of operation in accordance with embodiments described herein.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying figures.

Described herein is a configuration for a VTOL hexrotor aircraft with a canard. In accordance with features of embodiments described herein, the aircraft is a distributed propulsion unmanned aerial vehicle (UAV) that may be all-electric, hybrid-electric, hybrid-hydraulic, or mechanical. Six rotors provide lift for VTOL operation. The forward two rotors may be two-bladed and may be mounted on the top side of pylons that trail the canard. The middle two rotors may be two-bladed and may be mounted on the top side of pylons that extend forward from the wings. The aft two rotors may include at least two blades and may be mounted on pylons that trail the wings. In hover mode, the aft rotors tilt down to provide lift. All of the rotors are mounted in a concentric circle about the center of gravity (CG) of the aircraft. In VTOL mode, the aircraft acts as a multirotor, with all control provided by variable RPM or variable pitch control.

In accordance with features of embodiments described herein, all of the rotors are located equidistantly from the CG of the aircraft and are equally spaced from each other, thus making the aircraft easier to control in the event of the loss of a rotor. In certain embodiments, the combination of a swept wing and a canard combined with the aforementioned rotor placement minimizes download.

In cruise mode, the aft rotors may rotate from pointing down to pointing aft, becoming pusher props. The middle and forward rotors may stop rotating and may lock so that the blades are in line with the pylons to minimize drag. In this configuration, the aircraft operates as a swept wing canard aircraft. Pitch control may be provided by elevator surfaces on the canard and roll control may be provided by ailerons on the wings. Directional control may be provided by rudders on the wing endplates. In certain embodiments, nose landing gear may be retracted to reduce drag. The main landing gear may be fixed and may be outfitted with wheel pants to reduce drag. The aircraft can be configured for many missions, including cargo carry or intelligence, surveillance, reconnaissance (ISR) capability. In certain embodiments, the aircraft has high lift-to-drag (L/D) ratio. Additionally, in certain embodiments, the CG in both hover and cruise modes are well matched. Fuel may be stored in inboard sections of the wing and wing strakes. For various aircraft, additional fuel may be carried in the cargo section, or fuselage.

Figure 1B:
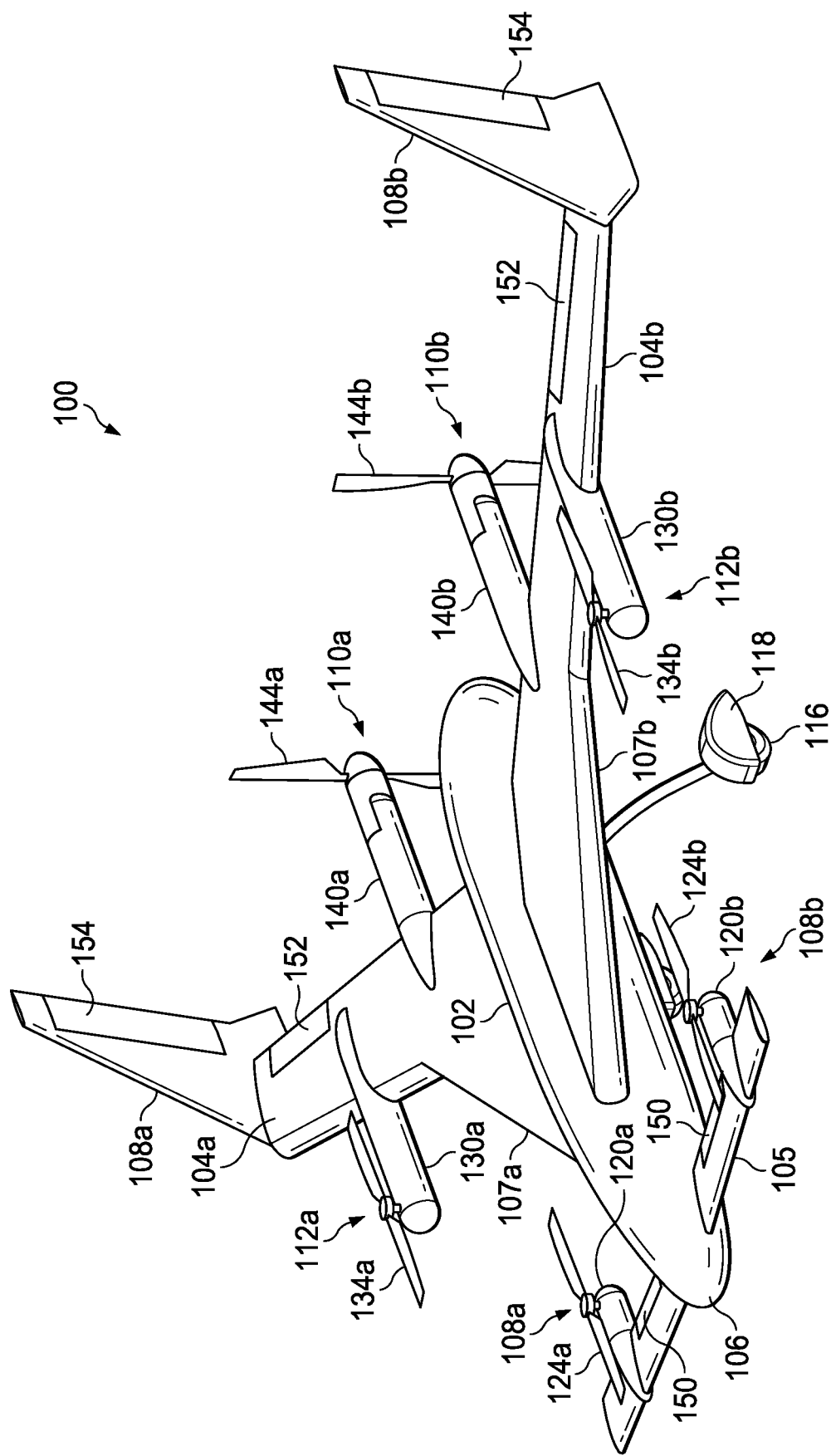
FIG. 1B illustrates a perspective view of the tilting hexrotor aircraft of FIG. 1A with the rotors configured in a cruise mode of operation in accordance with embodiments described herein.

FIGS. 1A and 1B illustrate an example tiltrotor aircraft 100 in accordance with features of embodiments described herein. As shown in FIGS. 1A and 1B, aircraft 100 is convertible between a VTOL or hover (also commonly referred to as helicopter) mode (shown in FIG. 1A), which allows for vertical take-off and landing, hovering, and low speed directional movement, and a cruise (also commonly referred to as airplane) mode (shown in FIG. 1B), which allows for forward flight as well as horizontal take-off and landing. Aircraft 100 includes a fuselage 102, swept wings 104a, 104b, and a canard 105 forward of the wings 104a, 104b proximate a nose 106 of aircraft 100. Aircraft 100 further includes wing strakes 107a, 107b, on opposite sides of the fuselage 102 and forward of the wings 104a, 104b. As shown in FIGS. 1A and 1B, wings 104a, 104b, sweep aft and include wing plates 108a, 108b, which extend substantially vertically from wings 104a, 104b, or may be canted. In certain embodiments, fuel may be stored in inboard sections of wings 104a, 104b, wing strakes 107a, 107b, and/or in a cargo portion of the fuselage 102.

In accordance with features of embodiments described herein, aircraft 100 further includes three pairs of propulsion systems, including forward propulsion systems 108a, 108b, connected to a trailing edge of the canard 105 on opposite sides of the fuselage 102, aft propulsion systems 110a, 110b, connected to trailing edges of wings 104a, 104b, and a pair of wing-mounted propulsion systems 112a, 112b, connected to leading edges of wings 104a. 104b.

As shown in FIG. 1A, aircraft 100 further includes nose landing gear 114, which may be retracted to reduce drag, as shown in FIG. 1B. Main landing gears 116 may be fixed and outfitted with wheel pants 118 to reduce drag. Aircraft 100 may be configured for a variety of cargo or sensor payloads.

In the embodiment illustrated in FIGS. 1A and 1B, each forward propulsion system 108a, 108b, includes a drive system housing comprising a pylon 120a, 120b, and a rotatable open rotor assembly mounted on top of the pylon and comprising a plurality of rotor blades 124a, 124b, connected to a rotor shaft and configured to rotate about a rotor axis. In the illustrated embodiment, forward ends of pylons 120a, 120b, are connected to a trailing edge of canard 105 on opposite sides of the fuselage 102 and aft ends of pylons 120a, 120b, support the rotor assemblies above and aft of the canard 105. As shown in FIGS. 1A and 1B, each rotor assembly includes two (2) rotor blades; however, it should be recognized that more blades may be implemented without departing from the spirit and the scope of the embodiments described. Rotation of rotor blades 124a, 124b, about rotor axis generates lift while operating in helicopter, or hover, mode. Each pylon 120a, 120b, may house one or more electric motors therein configured to produce rotational energy that drives the rotation of rotor assembly. Alternatively, each pylon 120a, 120b, may house a gearbox therein that drives the rotation of rotor assembly wherein the gearbox receives rotational energy from a driveshaft. Still further, each pylon 120a, 120b, may house a hybrid hydraulic system, whereby a motor drives a hydraulic pump and each rotor is powered by a hydraulic motor.

In the embodiment illustrated in FIGS. 1A and 1B, each wing-mounted propulsion system 112a, 112b, includes a drive system housing comprising a pylon 130a, 130b, and a rotatable open rotor assembly mounted on top of the pylon and comprising a plurality of rotor blades 134a, 134b, connected to a rotor shaft and configured to rotate about a rotor axis. In the illustrated embodiment, aft ends of pylons 130a, 130b, are connected to leading edges of wings 104a, 104b, outboard of pylons 120a, 120b, and forward ends of pylons 130a, 130b, support the rotor assemblies above and forward of wings 104a, 104b. As shown in FIGS. 1A and 1B, each rotor assembly includes two (2) rotor blades; however, it should be recognized that more blades may be implemented without departing from the spirit and the scope of the embodiments described. It should also be recognized that rotor assemblies may include a different number of rotor blades than other rotor assemblies. Rotation of rotor blades 134a, 134b, about the rotor axis generates lift while operating in helicopter, or hover, mode. Each pylon 130a, 130b, may house one or more electric motors therein configured to produce rotational energy that drives the rotation of rotor assembly. Alternatively, each pylon 130a, 130b, may house a gearbox therein that drives the rotation of rotor assembly, wherein the gearbox receives rotational energy from a driveshaft. Still further, each pylon 130a, 130b, may house a hybrid hydraulic system, whereby a motor drives a hydraulic pump and each rotor is powered by a hydraulic motor.

In the embodiment illustrated in FIGS. 1A and 1B, each aft propulsion system 110a, 110b, includes a drive system housing comprising a pylon 140a, 140b, and a rotatable open rotor assembly mounted on the bottom of the pylon and comprising a plurality of rotor blades 144a, 144b, connected to a rotor shaft and configured to rotate about a rotor axis. In the illustrated embodiment, forward ends of pylons 140a, 140b, are connected to trailing edges of the wings 104a, 104b, inboard of pylons 130a, 130b, and substantially in line with pylons 120a, 120b, and aft ends of pylons support the rotor assemblies below and aft of the wings 104a, 104b. As shown in FIGS. 1A and 1B, each rotor assembly includes two (2) rotor blades; however, it should be recognized that more blades may be implemented without departing from the spirit and the scope of the embodiments described. Rotation of rotor blades 144a, 144b, about the rotor axis generates lift while operating in helicopter mode. Each pylon 140a, 140b, may house one or more electric motors therein configured to produce rotational energy that drives the rotation of rotor assembly. Alternatively, each pylon 140a, 140b, may house a gearbox therein that drives the rotation of rotor assembly, wherein the gearbox receives rotational energy from a driveshaft. Still further, each pylon 140a, 140b, may house a hybrid hydraulic system, whereby a motor drives a hydraulic pump and each rotor is powered by a hydraulic motor.

The position of rotor assemblies, as well as the pitch of individual rotor blades 124a, 124b, 134a, 134b, 144a, 144b, can be selectively controlled in order to selectively control direction, thrust, and lift of aircraft 100. As previously noted, propulsion systems 110a, 110b, are each convertible, relative to fuselage 102, between a vertical position, as shown in FIG. 1A, and a horizontal position, as shown in FIG. 1B. Propulsion systems 110a, 110b, are in the vertical position during vertical take-off and landing mode. Vertical take-off and landing mode may be considered to include hover operations of aircraft 100. Propulsion systems 110a, 110b, are in the horizontal position during cruise mode, in which aircraft 100 is in forward flight. In cruise mode, propulsion systems 110a, 110b, direct their respective thrusts in the aft direction to propel aircraft 100 forward. Aircraft 100 is operable to fly in all directions during the vertical take-off and landing mode configuration of FIG. 1A, although faster forward flight is achievable while in the forward flight mode configuration of FIG. 1B. Propulsion systems 110a, 110b, may be tiltable between the vertical and horizontal positions by actuators (not shown) in response to commands originating from a pilot and/or a flight control system. Each of the propulsion systems 108a, 108b, 110a, 110b, 112a, 112b, may utilize an electric motor and gearbox unit disposed within a respective pylon 120a, 120b, 130a, 130b, 140a, 140b or a direct drive motor of group of motors on the same shaft as a power source to rotate the respective rotor assembly about rotor axis via a rotor shaft. The aircraft 100 could also use a hybrid hydraulic system, whereby a motor drives a hydraulic pump and each rotor is powered by a hydraulic motor In accordance with features of embodiments described herein, when aircraft 100 is in cruise mode, rotor assemblies of propulsion assemblies 108a, 108b, 112a, 112b, may cease rotation and be locked in place such that rotor blades 124a, 124b, 134a, 134b, align with respective pylons 120a, 120b, 130a, 130b, to reduce drag. Fewer active rotor assemblies in cruise mode improves propulsive efficiency of the aircraft.

With six rotor assemblies, a rotor assembly can be lost while still allowing aircraft 100 to hover even without motor redundancy per rotor assembly. In the event of a rotor failure, the rotor on the opposite side of the aircraft would be powered down, allowing the aircraft to hover as a quad copter with the four remaining rotors operating at elevated power levels. In accordance with features of embodiments described herein, if the aft left rotor were to fail, the forward right rotor would also be powered down, allowing the thrust on the remaining rotors to balance. Electric power to the motors allows the distributed nature of the aircraft 100 to stay weight efficient without requiring extensive cross-connects.

In cruise mode, pitch control for the aircraft 100 is provided by elevator surfaces 150 on the canard 105. Roll control for the aircraft 100 is provided by ailerons 152 on the wings 104a, 104b. Directional control for the aircraft 100 is provided by rudders 154 on wing endplates 108a, 108b. In hover mode, pitch, roll, and directional control for the aircraft 100 are provided by varying RPM or pitch at the rotors.

Figure 2A:
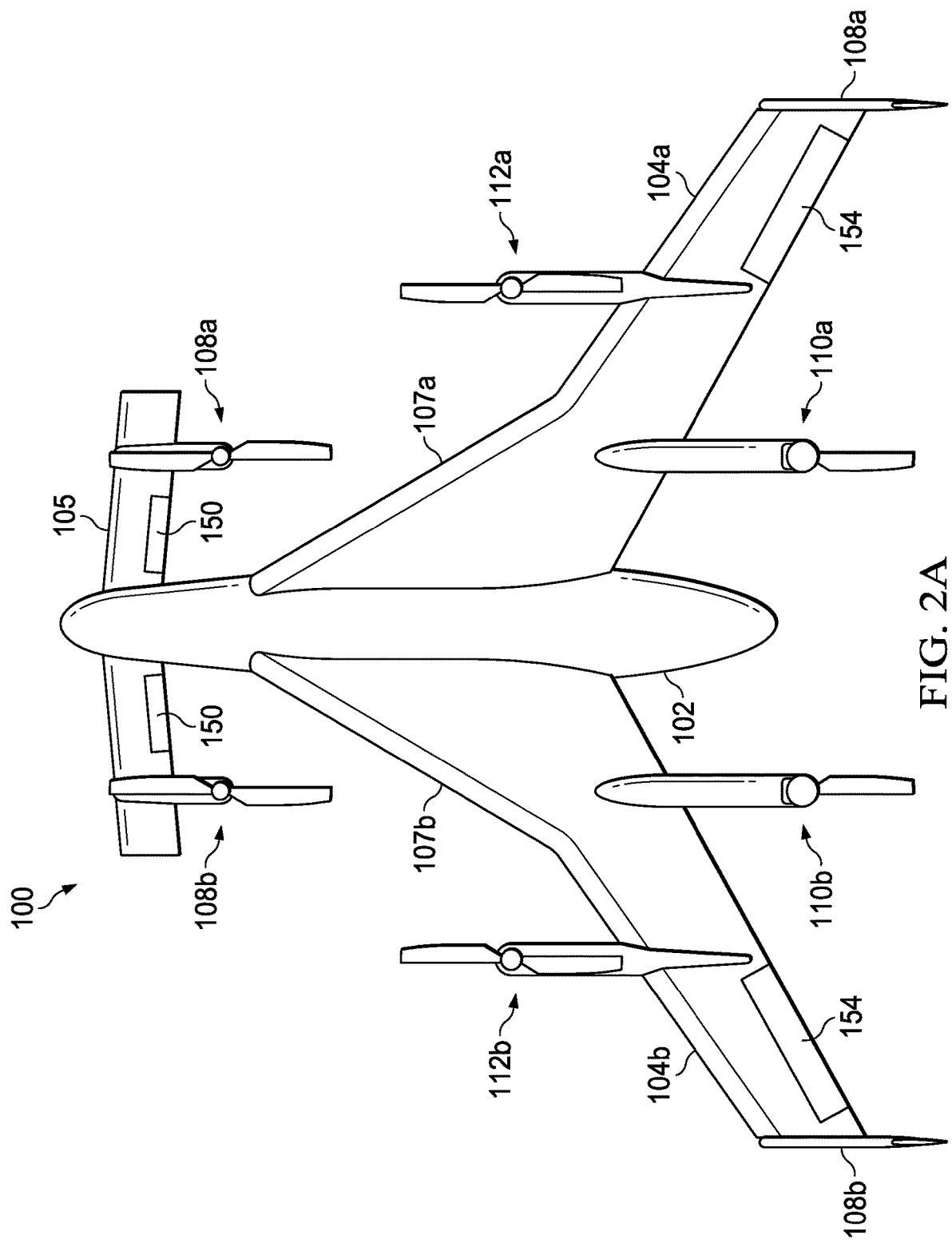
FIG. 2A illustrates a top plan view of the tilting hexrotor aircraft of FIGS. 1A and 1B with the rotors configured in a hover mode of operation in accordance with embodiments described herein.
Figure 2B:
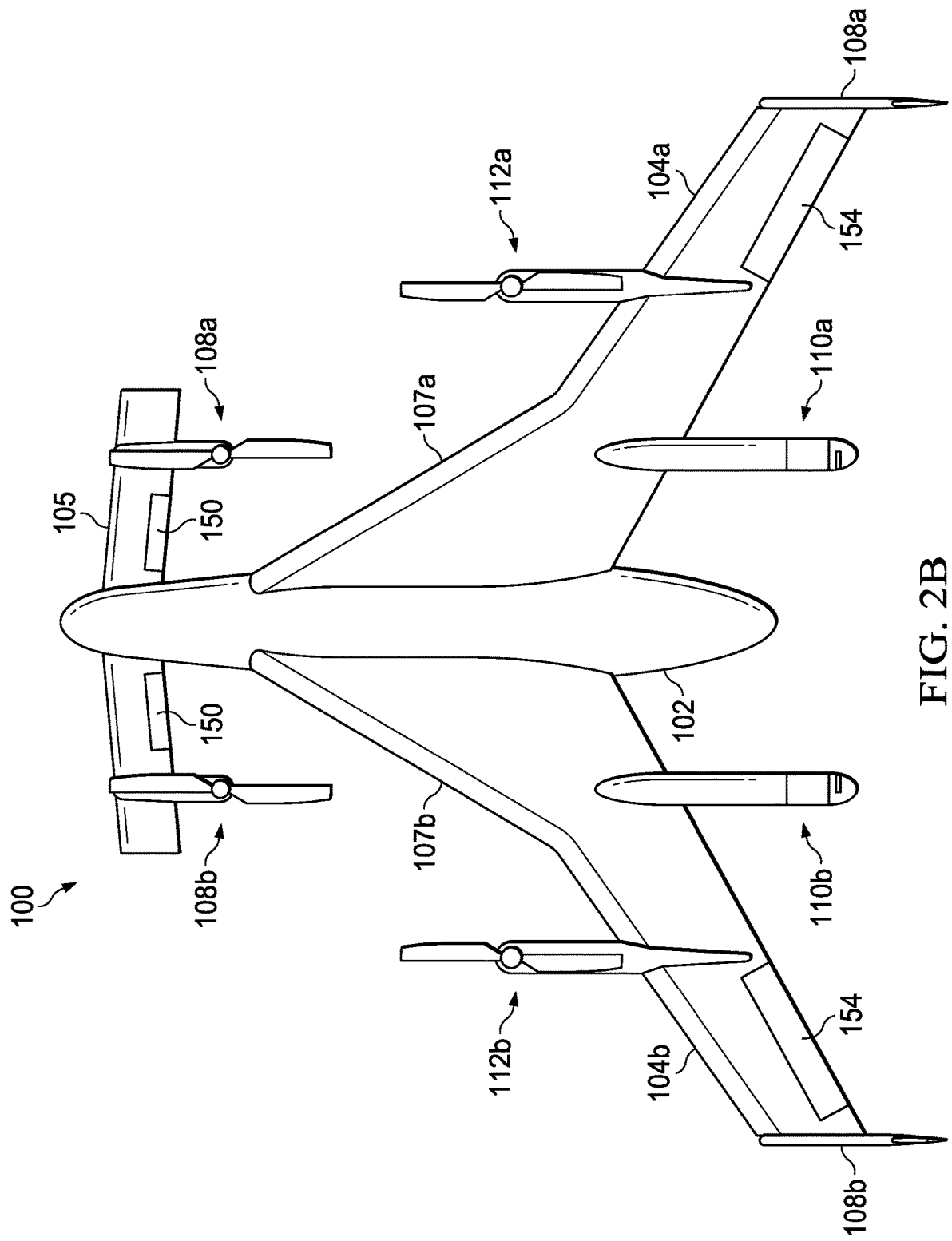
FIG. 2B illustrates a top plan view of the tilting hexrotor aircraft of FIGS. 1A and 1B with the rotors configured in a cruise mode of operation in accordance with embodiments described herein.

FIG. 2A illustrates a top plan view of the tilting hexrotor aircraft 100 in a hover mode of operation in accordance with embodiments described herein. FIG. 2B illustrates a top plan view of the tilting hexrotor aircraft 100 in a cruise mode of operation in accordance with embodiments described herein.

FIG. 3A illustrates a front plan view of the tilting hexrotor aircraft 100 in a hover mode of operation in accordance with embodiments described herein. FIG. 3B illustrates a front plan view of the tilting hexrotor aircraft 100 in a cruise mode of operation in accordance with embodiments described herein.

Figure 4:
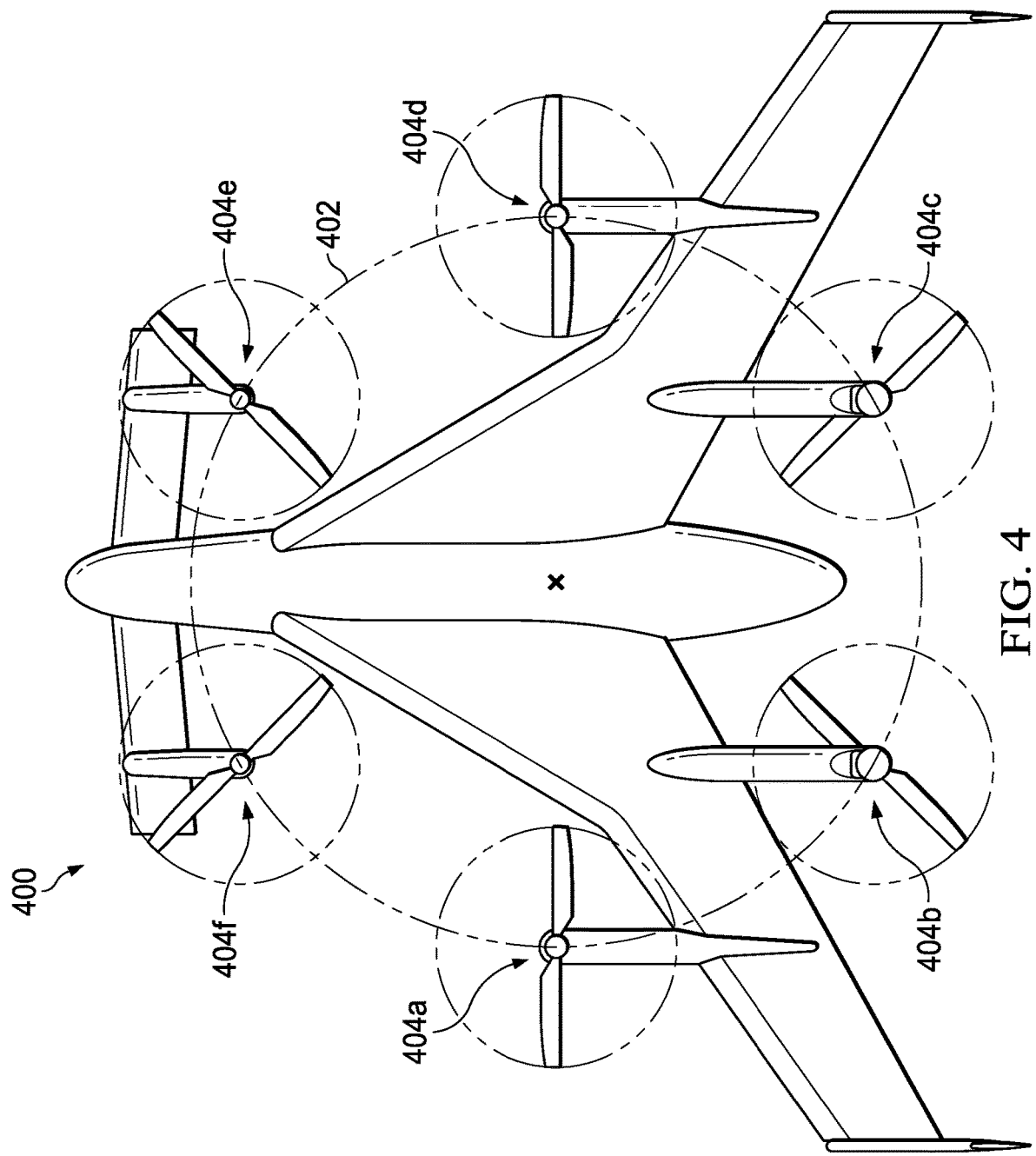
FIG. 4 illustrates a hexrotor arc arrangement of rotors of the tiltrotor aircraft of FIGS. 1A and 1B in accordance with embodiment described herein.

Because the aircraft 100 includes six (6) rotor assemblies, the aircraft may be referred to as a "hexrotor aircraft." FIG. 4 illustrates a hexrotor aircraft 400 that has a hexrotor arc arrangement 402 of the rotors 404a-404f when the aircraft is in hover mode. In particular, to allow the minimum number of rotors and still allow loss of a rotor as a recoverable failure mechanism in a hover, the rotors are arranged in an arc arrangement both side-to-side and forward-to-aft. As a result, when one rotor is lost and a second rotor is powered down, the aircraft can still be balanced as a quad arrangement on the remaining rotors. If a linear arrangement were used, the power and balance requirements would prevent recovery on just four rotors. Multi-copters with more than six rotors may recover by offsetting opposing rotors, but six in the illustrated arc arrangement is the minimum to allow a recovery after failure and result in significant weight savings due to fewer redundant motors and rotors.

In accordance with features of embodiments described herein, rotors 404a-404f are substantially equidistant from a CG 406 of the aircraft 400 and equally distributed radially about the hexrotor arc 402.

It should be appreciated that aircraft illustrated herein, such as aircraft 100, is merely illustrative of a variety of aircraft that can implement the embodiments disclosed herein. Indeed, the various embodiments of the electric drive system line replaceable unit described herein may be used on any aircraft that utilizes motors. Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, and the like. As such, those skilled in the art will recognize that the embodiments described herein for an electric drive system line replaceable unit can be integrated into a variety of aircraft configurations. It should be appreciated that even though aircraft are particularly well-suited to implement the embodiments of the present disclosure, non-aircraft vehicles and devices can also implement the embodiments.

The components of rotor assemblies described herein may comprise any materials suitable for use with an aircraft rotor. For example, rotor blades and other components may comprise carbon fiber, fiberglass, or aluminum; and rotor shafts and other components may comprise steel or titanium.

Example 1 provides an aircraft operable in a hover mode and a cruise mode, the aircraft including a fuselage; first and second wings connected on opposite sides of the fuselage; a canard connected to the fuselage forward of the first and second wings; first and second forward propulsion systems connected to a trailing edge of the canard on opposite sides of the fuselage; first and second aft propulsion systems connected to trailing edges of the first and second wings; and first and second wing-mounted propulsion systems connected to leading edges of the first and second wings, wherein the first and second aft propulsion systems are tiltable between a first position when the aircraft is in the hover mode and a second position when the aircraft is in the cruise mode; wherein each of the propulsion systems includes a rotor assembly including a plurality of rotor blades; and wherein the propulsion systems are substantially equidistant from a center of gravity (CG) of the aircraft.

Example 2 provides the aircraft of example 1, wherein the propulsion systems are substantially equally distributed radially about the CG.

Example 3 provides the aircraft of any of examples 1-2, wherein each of the first and second wings includes a wing plate on an outboard end of the wing and wherein the wing plate is substantially vertical or canted with reference to the wing.

Example 4 provides the aircraft of any of examples 1-3, further including first and second wing strakes connected on opposite sides of the fuselage forward of the wings.

Example 5 provides the aircraft of any of examples 1-4, wherein each of the first and second forward propulsion systems include pylons fixedly connected to the canard.

Example 6 provides the aircraft of example 5, wherein the rotor blades of the first and second propulsion systems rotate above the pylons.

Example 7 provides the aircraft of any of examples 1-6, wherein each of the first and second wing-mounted propulsion systems include pylons fixedly connected to the wings.

Example 8 provides the aircraft of example 7, wherein the rotor blades of each of the first and second wing-mounted propulsion systems rotate above the pylons.

Example 9 provides the aircraft of any of examples 1-8, wherein each of the first and second aft propulsion systems include pylons tiltably connected to the wings.

Example 10 provides the aircraft of any of example 9, wherein the rotor blades of each of the first and second aft propulsion systems rotate below the pylons when the aircraft is in hover mode and aft of the wings when the aircraft is in cruise mode.

Example 11 provides the aircraft of any of examples 1-10, wherein the plurality of rotor blades includes at least two rotor blades.

Example 12 provides the aircraft of any of examples 1-11, wherein the aft propulsion systems include a different number of rotor blades than the forward and wing-mounted propulsion systems.

Example 13 provides the aircraft of any of examples 1-12, wherein the first and second aft propulsion systems are connected to the wings inboard of the first and second wing-mounted propulsion systems.

Example 14 provides a vertical take-off and landing vehicle (VTOL) including a fuselage; aft-sweeping wings connected on opposite sides of the fuselage; a canard connected to the fuselage forward of the wings; forward propulsion systems including first pylons fixedly connected to a trailing edge of the canard on opposite sides of the fuselage; aft propulsion systems including second pylons rotatably connected to trailing edges of the wings, wherein the second pylons are tiltable between a first position when the VTOL is in a hover mode and a second position when the VTOL is in a cruise mode; and wing-mounted propulsion systems including third pylons fixedly connected to leading edges of the wings outboard of the second pylons, wherein the propulsion systems are substantially equidistant from a center of gravity (CG) of the VTOL and distributed substantially equally radially about the CG.

Example 15 provides the VTOL of example 14, wherein each of the wings includes a substantially vertical wing plate on an outboard end of the wing.

Example 16 provides the VTOL of any of examples 14-15, wherein each of the wings includes a swept wing portion and a wing strake connected to the fuselage forward of the swept wing portion.

Example 17 provides the VTOL of any of examples 14-16, wherein rotor blades of the forward propulsion systems rotate above the first pylons when the VTOL is in the hover mode and are prevented from rotating when the VTOL is in the cruise mode.

Example 18 provides the VTOL of any of examples 14-17, wherein the rotor blades of the wing-mounted propulsion systems rotate above the third pylons when the VTOL is in the hover mode and are prevented from rotating when the VTOL is in the cruise mode.

Example 19 provides the VTOL of any of examples 14-18, wherein the rotor blades of each of the aft propulsion systems rotate below the second pylons when the VTOL is in hover mode and the rotor blades of each of the aft propulsion systems rotate aft of the wings when the VTOL is in cruise mode.

Example 20 provides the VTOL of any of examples 14-19, wherein the CG of the VTOL is substantially the same as a center of lift of the VTOL when the VTOL is in the hover mode.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the Specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. An aircraft operable in a hover mode and a cruise mode, the aircraft comprising:
    a fuselage;
    first and second wings connected on opposite sides of the fuselage;
    a canard connected to the fuselage forward of the first and second wings;
    first and second forward propulsion systems connected to pylons mounted to a trailing edge of the canard on opposite sides of the fuselage;
    first and second aft propulsion systems connected to pylons mounted on trailing edges of the first and second wings; and
    first and second wing-mounted propulsion systems connected to leading edges of the first and second wings;
    wherein the first and second aft propulsion systems are tiltable relative to the pylons mounted on the trailing edges of the first and second wings between a first position when the aircraft is in the hover mode and a second position when the aircraft is in the cruise mode;
    wherein each of the propulsion systems includes a rotor assembly comprising a plurality of rotor blades; and
    wherein the propulsion systems are substantially equidistant from a center of gravity (CG) of the aircraft.

2. The aircraft of claim 1, wherein the propulsion systems are substantially equally distributed radially about the CG.

3. The aircraft of claim 1, wherein each of the first and second wings includes a wing plate on an outboard end of the wing and wherein the wing plate is substantially vertical or canted with reference to the wing.

4. The aircraft of claim 1, further comprising first and second wing strakes connected on opposite sides of the fuselage forward of the wings.

5. The aircraft of claim 1, wherein each of the first and second forward propulsion systems comprise pylons fixedly connected to the canard.

6. The aircraft of claim 5, wherein the rotor blades of the first and second propulsion systems rotate above the pylons.

7. The aircraft of claim 1, wherein each of the first and second wing-mounted propulsion systems comprise pylons fixedly connected to the wings.

8. The aircraft of claim 7, wherein the rotor blades of each of the first and second wing-mounted propulsion systems rotate above the pylons.

9. The aircraft of claim 1, wherein each of the first and second aft propulsion systems comprise pylons tiltably connected to the wings.

10. The aircraft of claim 9, wherein the rotor blades of each of the first and second aft propulsion systems rotate below the pylons when the aircraft is in hover mode and aft of the wings when the aircraft is in cruise mode.

11. The aircraft of claim 1, wherein the plurality of rotor blades comprises at least two rotor blades.

12. The aircraft of claim 1, wherein the aft propulsion systems comprise a different number of rotor blades than the forward and wing-mounted propulsion systems.

13. The aircraft of claim 1, wherein the first and second aft propulsion systems are connected to the wings inboard of the first and second wing-mounted propulsion systems.

14. A vertical take-off and landing vehicle (VTOL) comprising:
   a fuselage;
   aft-sweeping wings connected on opposite sides of the fuselage;
   a canard connected to the fuselage forward of the wings;
   forward propulsion systems comprising first pylons fixedly connected to a trailing edge of the canard on opposite sides of the fuselage;
   aft propulsion systems comprising second pylons rotatably connected to trailing edges of the wings, wherein the second pylons are tiltable between a first position when the VTOL is in a hover mode and a second position when the VTOL is in a cruise mode; and
   wing-mounted propulsion systems comprising third pylons fixedly connected to leading edges of the wings outboard of the second pylons;
   wherein the propulsion systems are substantially equidistant from a center of gravity (CG) of the VTOL and distributed substantially equally radially about the CG; and
   wherein the rotor blades of each of the aft propulsion systems rotate below the second pylons when the VTOL is in hover mode and the rotor blades of each of the aft propulsion systems rotate aft of the wings when the VTOL is in cruise mode.

15. The VTOL of claim 14, wherein each of the wings includes a substantially vertical wing plate on an outboard end of the wing.

16. The VTOL of claim 14, wherein each of the wings comprises a swept wing portion and a wing strake connected to the fuselage forward of the swept wing portion.

17. The VTOL of claim 14, wherein rotor blades of the forward propulsion systems rotate above the first pylons when the VTOL is in the hover mode and are prevented from rotating when the VTOL is in the cruise mode.

18. The VTOL of claim 14, wherein the rotor blades of the wing-mounted propulsion systems rotate above the third pylons when the VTOL is in the hover mode and are prevented from rotating when the VTOL is in the cruise mode.

19. The VTOL of claim 14, wherein the CG of the VTOL is substantially the same as a center of lift of the VTOL when the VTOL is in the hover mode.

20. An aircraft comprising:
   a fuselage;
   aft-sweeping wings connected on opposite sides of the fuselage;
   a canard connected to the fuselage forward of the wings;
   forward propulsion systems comprising first pylons fixedly connected to a trailing edge of the canard on opposite sides of the fuselage;
   aft propulsion systems comprising second pylons rotatably connected to trailing edges of the wings and electric motors within the second pylons, wherein the second pylons are tiltable between a first position when the VTOL is in a hover mode and a second position when the VTOL is in a cruise mode; and
   wing-mounted propulsion systems comprising third pylons fixedly connected to leading edges of the wings outboard of the second pylons;
   wherein the propulsion systems are substantially equidistant from a center of gravity (CG) of the VTOL and distributed substantially equally radially about the CG.

* * * * *